United States Patent [19]

Kim et al.

[11] 4,281,841
[45] Aug. 4, 1981

[54] O-RING SEALING ARRANGEMENTS FOR ULTRA-HIGH VACUUM SYSTEMS

[75] Inventors: Chang-Kyo Kim, Knoxville, Tenn.; Robert Flaherty, Mt. Lebanon, Pa.

[73] Assignee: The United States of America as represented by the United States Department of Energy, Washington, D.C.

[21] Appl. No.: 891,797

[22] Filed: Mar. 30, 1978

[51] Int. Cl.² .................... F16J 15/08; F16L 25/00
[52] U.S. Cl. .................................. 277/236; 277/1; 29/447; 285/381
[58] Field of Search .............. 277/236, 190, 191, 1, 277/26; 29/447; 285/41, 66, 381

[56] References Cited

U.S. PATENT DOCUMENTS

| 2,224,145 | 12/1940 | Dugan et al. ................. 29/447 X |
| 3,315,986 | 4/1967 | Quick ........................... 285/381 X |
| 3,805,567 | 4/1974 | Agius-Sinerco .............. 285/381 X |
| 3,872,573 | 3/1975 | Nichols et al. ............... 285/381 X |
| 3,971,566 | 7/1976 | Levinsohn et al. ........... 277/1 X |

FOREIGN PATENT DOCUMENTS

| 620892 | 11/1962 | Belgium ............................ 277/236 |
| 372153 | 3/1923 | Fed. Rep. of Germany ......... 29/447 |
| 2065651 | 10/1974 | Fed. Rep. of Germany ...... 285/381 |
| 873095 | 7/1961 | United Kingdom ............... 285/381 |
| 1327441 | 8/1973 | United Kingdom ............... 29/447 |

Primary Examiner—Robert S. Ward, Jr.
Attorney, Agent, or Firm—Edward L. Levine

[57] ABSTRACT

An all metal reusable O-ring sealing arrangement for sealing two concentric tubes in an ultra-high vacuum system. An O-ring of a heat recoverable alloy such as Nitinol is concentrically positioned between protruding sealing rings of the concentric tubes. The O-ring is installed between the tubes while in a stressed martensitic state and is made to undergo a thermally induced transformation to an austenitic state. During the transformation the O-ring expands outwardly and contracts inwardly toward a previously sized austenitic configuration, thereby sealing against the protruding sealing rings of the concentric tubes.

7 Claims, 7 Drawing Figures

O-RING SEALING ARRANGEMENTS FOR ULTRA-HIGH VACUUM SYSTEMS

This invention was made or conceived in the course of or under Contract No. E(11-1)3073, Subcontract No. 192, with the U.S. Department of Energy.

CROSS-REFERENCE TO RELATED APPLICATIONS

The invention herein disclosed is closely related to the following documents:

(1) U.S. patent application Ser. No. 891,675, filed concurrently herewith in the name of R. Flaherty entitled ULTRA-HIGH VACUUM SEAL ARRANGEMENT, which discloses other ultra-high vacuum sealing arragements utilizing heat recoverable alloys.

(2) U.S. Pat. No. 3,174,851 in the name of William J. Beuhler issued Mar. 23, 1965 entitled NICKEL-BASE ALLOYS WHICH DISCLOSES HEAT RECOVERABLE NICKLE-TITANIUM ALLOYS, and which is incorporated by reference herein.

BACKGROUND OF THE INVENTION

1. Field of the Invention

This invention relates to ultra-high vacuum systems and more particularly provides remotely actuatable and demountable sealing arrangements among cylindrical components of such systems.

2. Description of the Prior Art

One of the most effective sealing devices available is the rubber or elastomeric O-ring, which is widely used to seal components containing liquids and gases. In the most common application, the O-ring forms a seal between two concentric cylindrical surfaces. The ring is stretched over the inner cylinder and is compressed radially inward by the outer cylinder, so that its cross section, typically circular in the free state, is slightly flattened where it is in contact with the cylinders. For low and moderate pressure differentials these two circumferential contact zones are sufficient to form the seal. For higher pressures the O-ring is typically confined in a groove to prevent axial displacement by rolling. Fluid pressure along with the contact force between the O-ring and the low-pressure side of the groove exert axial pressure on the O-ring. As a result of this loading, the outside diameter of the O-ring tends to increase and the inside diameter tends to decrease and, because both of these diameters are fixed, the radial contact pressure is increased and the axial length of the seal strips is increased. Thus, in this application the O-ring seal is a ring the outside diameter of which tends to expand and the inside diameter of which tends to contract, with both tendencies restrained by the surrounding concentric cylinders.

For ultra-high vacuum (UHV) systems, those operating in a range below approximately $10^{-6}$ Torr, rubber and elastomers are not suitable as they are permeable to gases to such an extent that a very low base pressure cannot be attained. Further, they contain traces of solvents, plasticizers and other constituents which boil out of them, and such seals cannot survive the high temperatures sometimes necessary to bake out metal ultra-high vacuum systems.

Metallic alloys presently exist which exhibit unique "shape memory" characteristics while undergoing phase transformations between martensitic and austenitic states brought about by passing the alloy through an established temperature range. Such alloys are commonly referred to as "heat recoverable" and include combinations of gold and cadmium, copper and zinc, indium and thallium, copper and tin, and various combinations of nickel and titanium such as those discussed in the referenced Beuhler patent, among others. The nickel-titanium alloys, including those having smaller amounts of other elements, are commonly referred to as "Nitinol," and are commercially available from the Raychem Corporation, Menlo Park, Calif., which also markets Cryoseal® hermetic seals for semiconductor packages, Cryofit® mechanical pipe couplings and Cryoplug® seals for hydraulic components, all of which incorporate Nitinol components. These products, while providing excellent service for their intended purposes, have characteristics inconsistent with UHV system applications. For example, the pipe coupling contains multiple circumferential surfaces in series which plastically deform the coupled pipes at the tips of the surfaces, which can lead to virtual leaks in UHV systems. Such couplings further are not reusable without reworking.

It is desirable to provide a sealing arrangement which advantageously operates in a manner similar to a rubber O-ring and which further is adaptable to the constraints of ultra-high vacuum systems. It is further desirable to provide such an arrangement which is remotely actuatable and reusable.

SUMMARY OF THE INVENTION

This invention provides all metal sealing arrangements for concentric metallic tubes in an ultra-high vacuum system utilizing tubular O-rings made of a heat-recoverable metal alloy. The arrangement are remotely actuatable and the sealing O-ring can be removed from and replaced on the sealed tubes without loss of high vacuum sealing integrity.

The sealing O-ring, preferably of Nitinol, can be fabricated in its austenitic state as a tube of larger outside diameter and smaller inside diameter than the cylindrical surfaces against which it will seal. The O-ring is then transformed to its lower strength martensitic state by chilling, and is then strained axially to an increased inner diameter and decreased outer diameter. When positioned in an annulus between the two concentric tubes and heated through its transformation temperature range to austenite, it expands outwardly and contracts inwardly toward the fabricated austenitic dimensions. The phase transformation occurs with sufficient energy to cause circumferential plastic deformation of the surfaces it seals against.

In one embodiment the outer tube or sleeve has an internal circumferentially protruding seal ring and the inner tube has two external circumferentially protruding seal rings which form the seal surfaces. The single ring of the outer sleeve is positioned longitudinally between the dual rings of the inner tube, as is a bore hole through the wall of the inner tube. This arrangement alleviates the potential for virtual leaks typically occurring between multiple seals in series, as the annular area between the two rings on the inner tube communicates directly, through the bore hole, with the interior of the ultra-high vacuum system piping and can be pumped down to the necessary vacuum conditions.

In another embodiment a singular internal circumferential protruding seal ring on the outer tube is positioned in alignment with a protruding external circumferential seal ring on the inner tube. A heat recoverable O-ring is positioned between the two seal rings to form the seal. This arrangement provides a shorter and lighter O-ring, and can require less machining of the tubular surfaces.

Locating shoulders can also be provided to laterally position the tubes and O-ring for proper installation.

BRIEF DESCRIPTION OF THE DRAWINGS

The advantages, nature and additional features of the invention will become more apparent from the following description, taken in connection with the accompanying drawings in which.

Figure 4A:
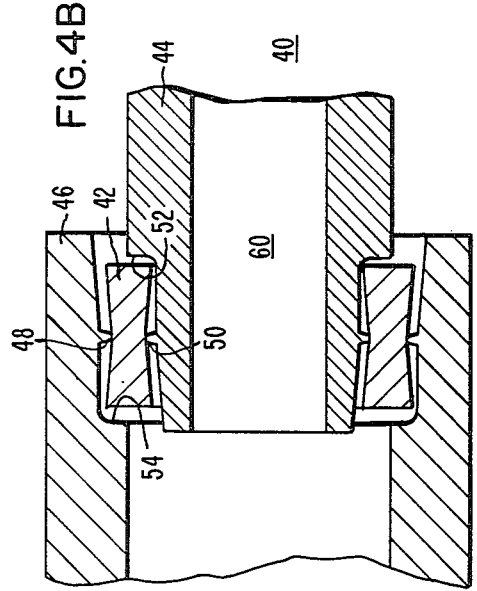
Figure 4B:
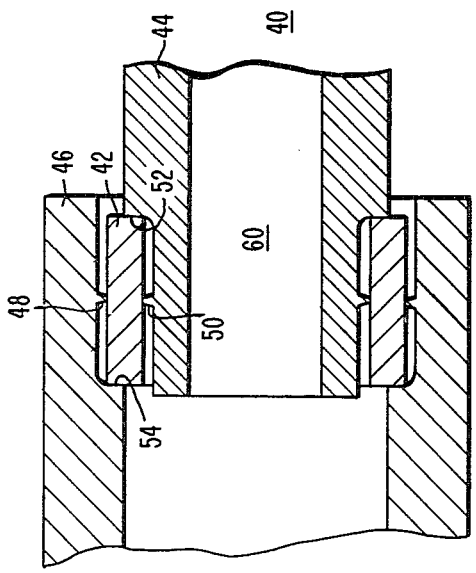
Figure 5:
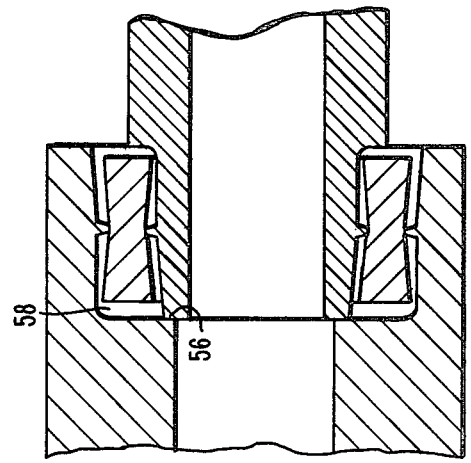

4A is a cross-sectional view showing a sealing arrangement in an installed configuration;

FIG. 4B is a cross-sectional view showing a sealing arrangement in a sealed configuration; and FIG. 5 is a cross-sectional view of another sealing arrangement.

DESCRIPTION OF THE PREFERRED EMBODIMENT

Figure 1A:
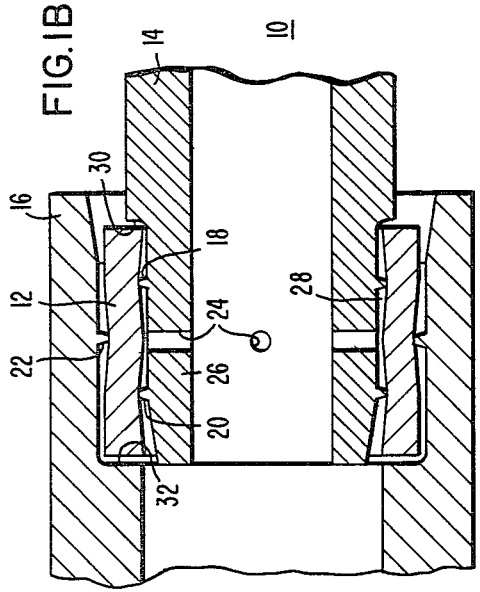
FIG. 1A is a cross-sectional view showing a sealing arrangement in an installed configuration.
Figure 1B:
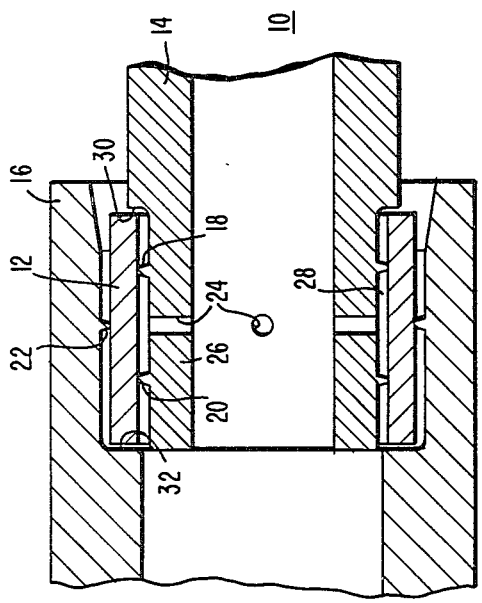
FIG. 1B is a cross-sectional view showing a sealing arrangement in a sealed configuration.

Referring now to FIGS. 1A and 1B, there is shown an all-metal ultra-high vacuum (UHV) O-ring seal arrangement 10 in accordance with one embodiment of the invention having an O-ring 12 with a strong tendency to increase in outside diameter and reduce in inside diameter. The O-ring is comprised of a heat-recoverable material such as Nitinol, for example, an alloy of 55 weight percent nickel and 45 weight percent titanium, which can be annealed in the austenitic phase, transformed by cooling into a martensitic phase, and then strained to as much as 10 percent deformation. Upon reheating it transforms again to austenite and energetically tries to return to its original austenitic dimensions. For the UHV sealing arrangements disclosed herein, the O-ring is preferably fabricated by means such as extrusion or machining into a tubular shape with an outside diameter approximately $2\frac{1}{2}$ percent larger and an inside diameter approximately $2\frac{1}{2}$ percent smaller than the surfaces against which the O-ring will seal, such as an inner metallic tube 14 and a concentric axially aligned outer metallic tube or sleeve 16. The seal tube 12 is then transformed to a relatively low strength martensite by chilling through the transformation temperature range of the heat-recoverable material. While it remains in the martensitic temperature range it is stretched axially, as in a tensile test, approximately 10 percent. When a tube is strained axially in this manner, the mean diameter is unchanged, but the outside diameter is reduced and the inside diameter is increased, in this case approximately 5 percent of the radial thickness each. While still in the martensitic condition the tube is cut into short rings of given length by any process, well known in the art, which does not raise the metal temperature into the transformation range. The O-rings 12 can be stored at this low temperature until installation.

For installation, the O-ring 12 is placed between the tubular cylinders 14, 16 which are preferably prechilled to the O-ring 12 temperature, with clearances approximately twice as large as would normally be provided for similar seal assemblies. The assembly is then allowed to warm through the transformation temperature range and, as the O-ring 12 transforms, its radial dimensional changes establish the seal zones.

While the O-ring can merely be so transformed so as to contact, plastically deform and circumferentially seal against the tubular surfaces, preferred orientations for UHV application seal against specific protruding circumferential rings. In FIGS. 1A and 1B the inner tube 14 is provided with two preferably integral external seal rings 18 and 20, and the outer sleeve 16 is provided with a singular internal seal ring 22. The seal rings are oriented such that the internal seal ring 22 is longitudinally positioned between the external seal rings 18, 20. Additionally, radial holes 24 are provided through the wall 26 of the inner tube 14, also positioned longitudinally between the external seal rings 18, 20, to provide fluid communication between an annular area 28 bounded by the external rings 18, 20 and the cylindrical surfaces of the O-ring 12 and inner tube 14 between the rings 18, 20. The radial holes 24 allow the annulus 28 to be pumped down, and the arrangement thus alleviates the virtual leaks often associated with ultra-high vacuum system sealing arrangements.

the O-ring 12, initially a short cylinder of uniform wall thickness (FIG. 1A) is of a length such that at initial installation the ends of the O-ring are in contact with locating shoulders 30, 32 of the inner tube 14 and sleeve 16. With the sleeve internal sealing ring 22 centered between the tube external sealing rings, this configuration forces the O-ring 12 to deflect under the seal loads rather than rotate about its centroid.

EXAMPLE

The O-ring dimensions can be determined as follows, the illustrative example being an O-ring seal with a mean diameter of two inches. The allowance "a" between a plug and a bore recommended by V. L. Maleev in "Machine Design," International Textbook Company, 1939, page 156, for a loose interchangeable assembly is $a = 0.0025^3\sqrt{d^2}$, where d is the mean diameter of the mating components in inches. To assure ease of assembly for rapid and remote installation, the allowance between the O-ring and the seal rings is made twice the recommended allowance and the tolerance on each diameter is made equal to the recommended allowance. Thus, the total resolved strain of a two-inch mean diameter O-ring may be eight times the Maleev recommended allowance, or 0.03175 inch. Resolved strain with respect to heat recoverable alloys and this application refers to the mechanically induced strain upon axial tensioning in the martensitic phase, as opposed to unresolved strain which is the strain of the Nitinol following the martensite to austenite transformation, restrained by the surrounding structures.

Figure 2:
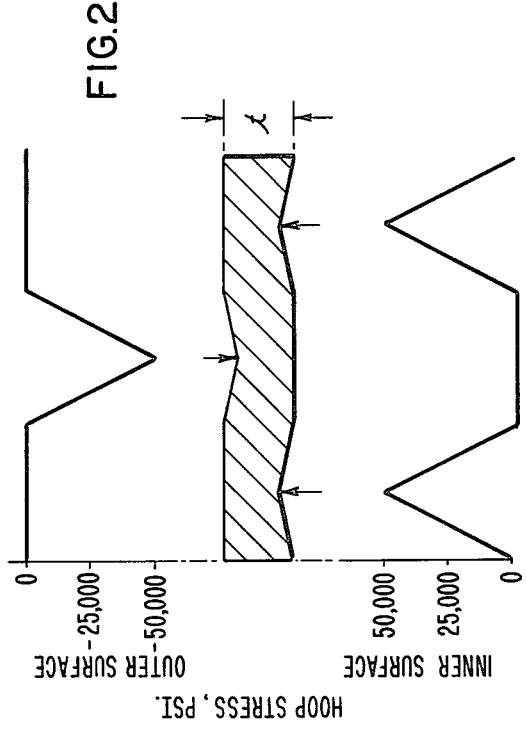
FIG. 2 is a graphical representation of the hoop stress longitudinally along an O-ring in accordance with an embodiment of this invention.

Plastic deformation of AISI 305 stainless steel by a Nitinol UHV seal contact requires a radial force of approximately 4,000 pounds per inch of seal length. For such forces to be generated by hoop stress in the Nitinol O-ring, reasonably assumed to be distributed as shown in FIG. 2, the O-ring thickness "t" must be 0.2 inch for a mean seal diameter of two inches and a maximum hoop stress of, for example, 50,000 psi. However, the total radial strain of 10 percent for such a ring is a deformation of only 0.020 inch, which is less than the possible clearance. Thus, the minimum thickness O-ring with satisfactory stress is too thin, and must be increased.

According to a stress-strain curve for austenitic Nitinol published in Raychem Corporation's brochure numbered ME-005, the unresolved strain equivalent to 50,000 psi stress is 0.75 percent. The 10 percent initial strain of the O-ring should therefore be:

$$0.10t = 0.03175 + 0.0075$$

and, $$t = 0.3432 \text{ inches}$$

Figure 3:
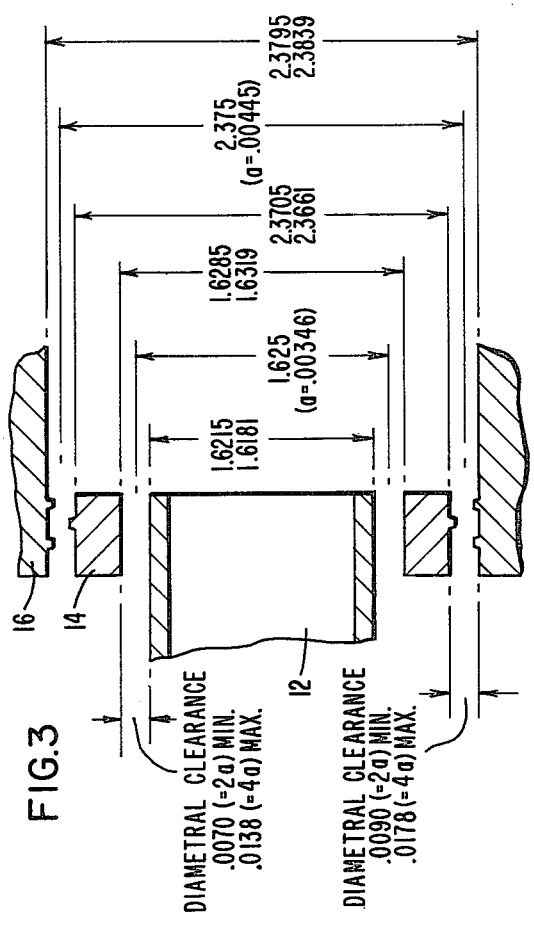
FIG. 3 is a schematic showing clearances and allowances among components in accordance with an exemplary embodiment of the invention.

Using conventional rounded-off dimensions, the thickness of the O-ring is therefore taken to be ⅜ inch or 0.375 inch. The seal element dimensions determined as described above are accordingly shown in FIG. 3. These dimensions result in the unresolved strain ranging from 0.79 percent to 1.95 percent, with the corresponding hoop stresses ranging from 52,000 psi to 69,000 psi. The depth of the seal ring protrusions can be varied, and in this example is five mils.

Another sealing arrangement 40 is shown in FIGS. 4A and 4B. Here an O-ring 42 is positioned between an inner tube 44 and outer sleeve 46, each of which have only one protruding sealing surface. A protruding internal sealing ring 48 on the sleeve is here positioned in the same plane as an external sealing ring 50 on the inner tube. The alignment is arranged at installation by the contact of the ends of the ring with the shoulders 52, 54 of the tube and sleeve. While this arrangement provides a shorter and lighter O-ring, if the seal ring 48, 50 are not properly aligned, moments may be created which would tend to rotate the O-ring about its centroid, lessening the integrity of the arrangement for UHV application. The alignment of the seal rings 48, 50 can be further assured by contact between the tube end and the sleeve-locating shoulder as shown at 56 in FIG. 5, but a virtual leak could result from the volume 58, through the contact 56, and into the ultra-high vacuum zone 60.

It will be apparent that many alternatives and equivalents are possible in view of the above teachings. For example, all available grades of Nitinol can be utilized, with transformation temperature ranges compatible with the specific UHV system employed. Additionally, the shape of the seal rings can be of various configuratons, such as flat, wedged, truncated or rounded, among others. Ohter alternates are possible. It therefore is to be understood that within the scope of the appended claims, the invention may be practiced other than as specifically described.

We claim:

1. An O-ring sealing arrangement for an ultra-high vacuum system comprising:
    a. a first metallic tube having an internally protruding sealing ring;
    b. a second metallic tube concentrically disposed within and spaced from said first tube, said second tube having two externally protruding sealing rings positioned laterally on opposite sides of said internal sealing ring and an opening disposed through the wall of said second tube positioned laterally between said external sealing rings; and
    c. an O-ring concentrically disposed between said first and second tubes extending longitudinally beyond each of said external sealing rings, said O-ring being made of a heat-recoverable metal.

2. The arrangement of claim 1 wherein said heat-recoverable metal is an alloy of nickel and titanium.

3. The arrangement of claim 1 wherein said first tube has an internal shoulder and said second tube has an external shoulder, said tubes being positionable such that said shoulders contact opposite ends of said O-ring.

4. An O-ring sealing arrangement for an ultra-high vacuum system comprising:
    a. a first metallic tube having an internally protruding sealing ring;
    b. a second metallic tube concentrically disposed within and spaced from said first tube having an externally protruding sealing ring substantially aligned with said internal sealing ring; and
    c. an O-ring concentrically disposed between said first and second tubes and said internal and external sealing rings, said O-ring being made of a heat-recoverable metal.

5. The sealing arrangement of claim 4 wherein said heat-recoverable metal is an alloy of nickel and titanium.

6. The arrangement of claim 4 wherein said first tube has an internal shoulder and said second tube has an external shoulder, said tubes being positionable such that said shoulders contact opposite ends of said O-ring.

7. A method of fabricating a metallic O-ring for demountably sealing an inner tube to a concentrically positioned and spaced outer tube in an ultra-high vacuum comprising:
    a. forming a heat-recoverable metallic material in an austenitic state into a tube of larger outside diameter than the inside diameter of said outer tube and of smaller inside diameter than the outside diameter of said inner tube;
    b. transforming said heat-recoverable tube to a martensitic state by chilling through the transformation temperature range of said tube; and
    c. axially tensioning said heat-recoverable tube so as to increase the inner diameter and decrease the outer diameter of said tube.

* * * * *